(12) United States Patent
Weatherly

(10) Patent No.: US 11,717,385 B2
(45) Date of Patent: Aug. 8, 2023

(54) ORTHODONTIC APPARATUS FOR PLACING ELASTIC BAND OVER DENTAL BRACE

(71) Applicants: Stephen Weatherly, Miami, FL (US); Brenton Alexander, Miramar, FL (US)

(72) Inventor: Stephen Weatherly, Miami, FL (US)

(73) Assignees: Stephen Weatherly; Brenton Alexander

( * ) Notice: Subject to any disclaimer, the term of this patent is extended or adjusted under 35 U.S.C. 154(b) by 13 days.

(21) Appl. No.: 17/577,050

(22) Filed: Jan. 17, 2022

(65) Prior Publication Data
US 2022/0133440 A1   May 5, 2022

Related U.S. Application Data

(60) Provisional application No. 63/138,797, filed on Jan. 19, 2021.

(51) Int. Cl.
*A61C 7/30*   (2006.01)

(52) U.S. Cl.
CPC .................... *A61C 7/306* (2013.01)

(58) Field of Classification Search
CPC ........................................ A61C 7/306
USPC .............................................. 433/3
See application file for complete search history.

(56) References Cited

U.S. PATENT DOCUMENTS

| | | | | |
|---|---|---|---|---|
| 4,127,940 A | * | 12/1978 | Shilliday ................. | A61C 7/12 433/22 |
| 4,668,186 A | * | 5/1987 | Bally ..................... | A61C 7/306 433/3 |
| 4,768,950 A | * | 9/1988 | Armstrong ............. | A61C 7/306 433/4 |
| 4,975,051 A | * | 12/1990 | Kargas ................... | A61C 7/02 433/3 |
| 5,054,647 A | * | 10/1991 | Yawata .................. | A61C 7/306 221/41 |
| 5,575,643 A | * | 11/1996 | Green .................... | A61C 7/306 606/140 |
| 5,738,512 A | * | 4/1998 | Cho ....................... | A61C 7/306 433/24 |
| 5,913,679 A | * | 6/1999 | Hirschfeld ............. | A61C 7/306 433/3 |

(Continued)

FOREIGN PATENT DOCUMENTS

| KR | 97020063 A | * | 5/1997 | .............. A61C 7/02 |
|---|---|---|---|---|
| WO | WO-0167981 A1 | * | 9/2001 | .............. A61C 7/306 |
| WO | WO-2019130157 A1 | * | 7/2019 | .............. A61C 7/02 |

*Primary Examiner* — Matthew M Nelson

(57) ABSTRACT

Orthodontic apparatus for placing elastic band over dental brace comprising a monolithic/unibody tool and a housing. The tool comprises an upper guide defining upper guide groove, a lower guide defining lower guide groove, a band interfacing surface, a hook portion defined below the band interfacing surface, a trunk portion and band storage post. The elastic band is operable to be received around the band interfacing surface and the hook portion. The lower guide groove allows for the elastic band to be operably released onto any one among multiple dental brace hooks. The upper guide allows for the elastic band to be operably received in the upper guide groove to enable the elastic band to be manoeuvred and released onto another of the dental brace hooks.

19 Claims, 10 Drawing Sheets

(56) References Cited

U.S. PATENT DOCUMENTS

| | | | | |
|---|---|---|---|---|
| 5,984,674 | A * | 11/1999 | Klein | A61C 7/306 433/18 |
| 6,254,383 | B1 * | 7/2001 | White | A61C 7/306 206/820 |
| 6,382,966 | B1 * | 5/2002 | Aknin | A61C 7/12 433/10 |
| 10,070,942 | B1 * | 9/2018 | Al Barakati | A61C 7/146 |
| 2008/0261173 | A1 * | 10/2008 | Campion | A61C 7/306 433/141 |
| 2009/0004616 | A1 * | 1/2009 | Morelli | A61C 7/306 433/3 |
| 2019/0151048 | A1 * | 5/2019 | Smith | A61C 7/02 |
| 2022/0133440 | A1 * | 5/2022 | Weatherly | A61C 7/306 433/3 |

* cited by examiner

ORTHODONTIC APPARATUS FOR PLACING ELASTIC BAND OVER DENTAL BRACE

BACKGROUND

Unless otherwise indicated herein, the materials described in this section are not prior art to this application and are not admitted to being prior art by inclusion in this section.

FIELD OF INVENTION

The subject matter in general relates to orthodontics and dentistry. More particularly, but not exclusively, the subject matter relates to a tool for placing elastic band over dental brace.

DISCUSSION OF RELATED ART

It is known that misalignment of teeth and jaws gives rise to various problems like increased facial stress and an overall poor facial appearance, among others. Dental braces have been employed for a long time in solving such issues of aligning the misaligned teeth and jaws. High strength elastic bands are further employed to supplement the dental braces for improved results. The elastic bands are disposed over hooks provided on the dental braces to assist in proper alignment and improving fit of upper and lower teeth during the bite-fixing phase of the orthodontic treatment, which is usually the longest and one of the difficult parts of the treatment process.

The elastic bands may be employed based on the requirements and would have to be replaced after a certain period of time as elastic bands tend to lose their tension. Furthermore, due to regular movement of the jaws the chances of the elastic bands snapping off and popping out of the hooks are high. Positioning of the elastic bands over the hooks is a tedious, difficult, and time-consuming process. The elastic bands can be replaced at home, but it is impractical for an individual at times to access few areas of mouth and is unhygienic to use hands to place the elastic bands.

In view of the foregoing, there is a need for a tool that can be employed in positioning the elastic bands over the hooks provided on the dental braces.

SUMMARY

In one aspect an orthodontic apparatus for placing elastic band over dental brace is disclosed. The apparatus comprises a monolithic/unibody tool and a housing. The tool comprises an upper guide, a lower guide, a band interfacing surface and a hook portion, among others. The upper guide defines an upper guide groove, wherein the upper guide is provided towards a superior end of the tool. The lower guide defines a lower guide groove, wherein the lower guide is provided below the upper guide. The band interfacing surface is defined between the upper guide and the lower guide. The hook portion is defined below the band interfacing surface. The elastic band is operable to be received around the band interfacing surface and the hook portion. The lower guide groove allows for the elastic band to be operably released onto any one among multiple dental brace hooks and the upper guide allows for the elastic band to be operably received in the upper guide groove to enable the elastic band to be manoeuvred and released onto another of the dental brace hooks.

BRIEF DESCRIPTION OF DRAWINGS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "Abut not B," "B but not A," and "A and B," unless otherwise indicated.

Figure 1:
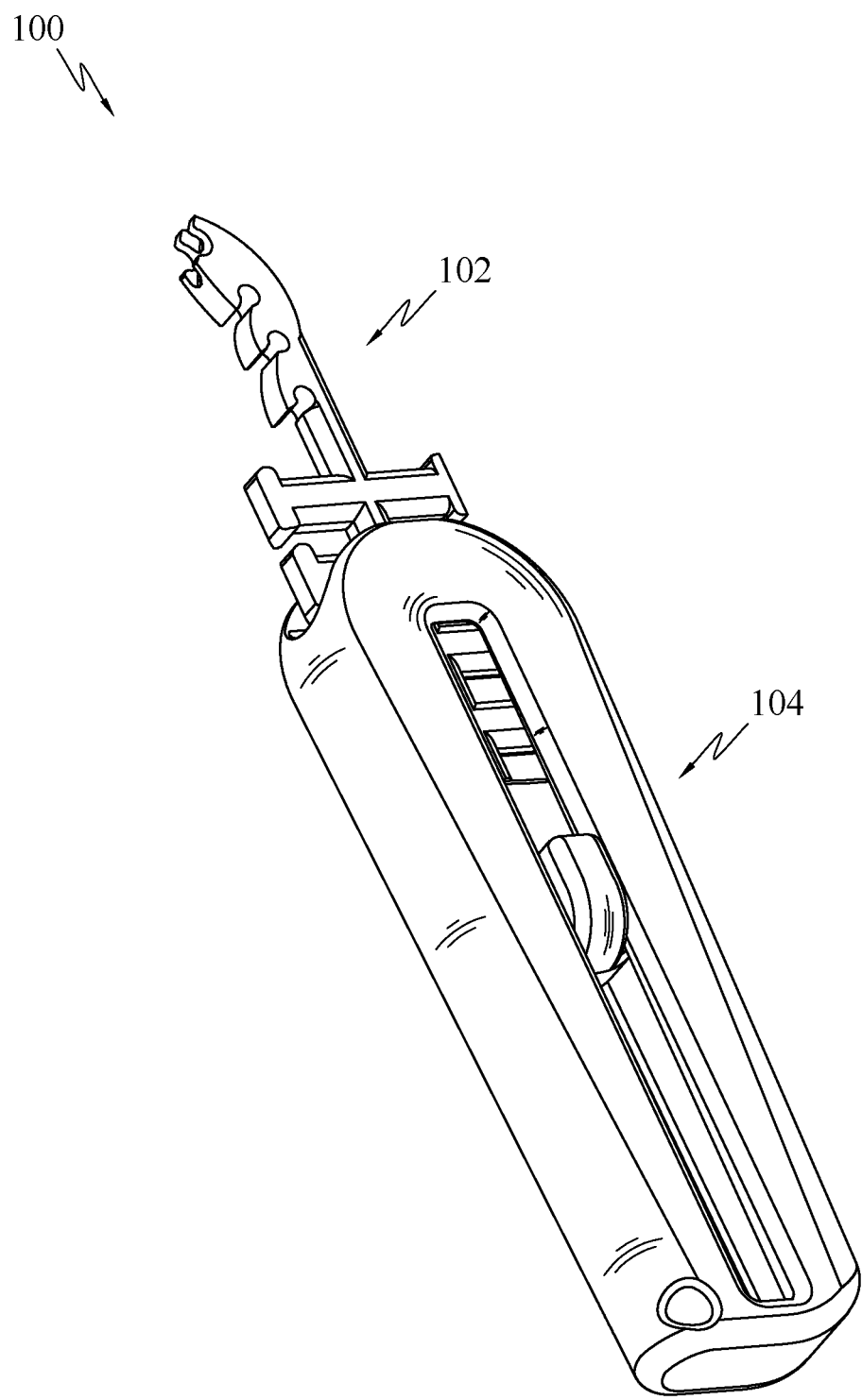
FIG. 1 illustrates a perspective view of an orthodontic apparatus 100, in accordance with an embodiment.

Referring to FIG. 1, a perspective view of an orthodontic apparatus 100 for placing elastic band over dental brace is provided, in accordance with an embodiment. The orthodontic apparatus 100 comprises a monolithic/unibody tool 102 and a housing 104. The monolithic/unibody tool 102 may be operably received by the housing 104. The monolithic/unibody tool 102 may be configured to be operably moved in and out of the housing 104.

Figure 2:
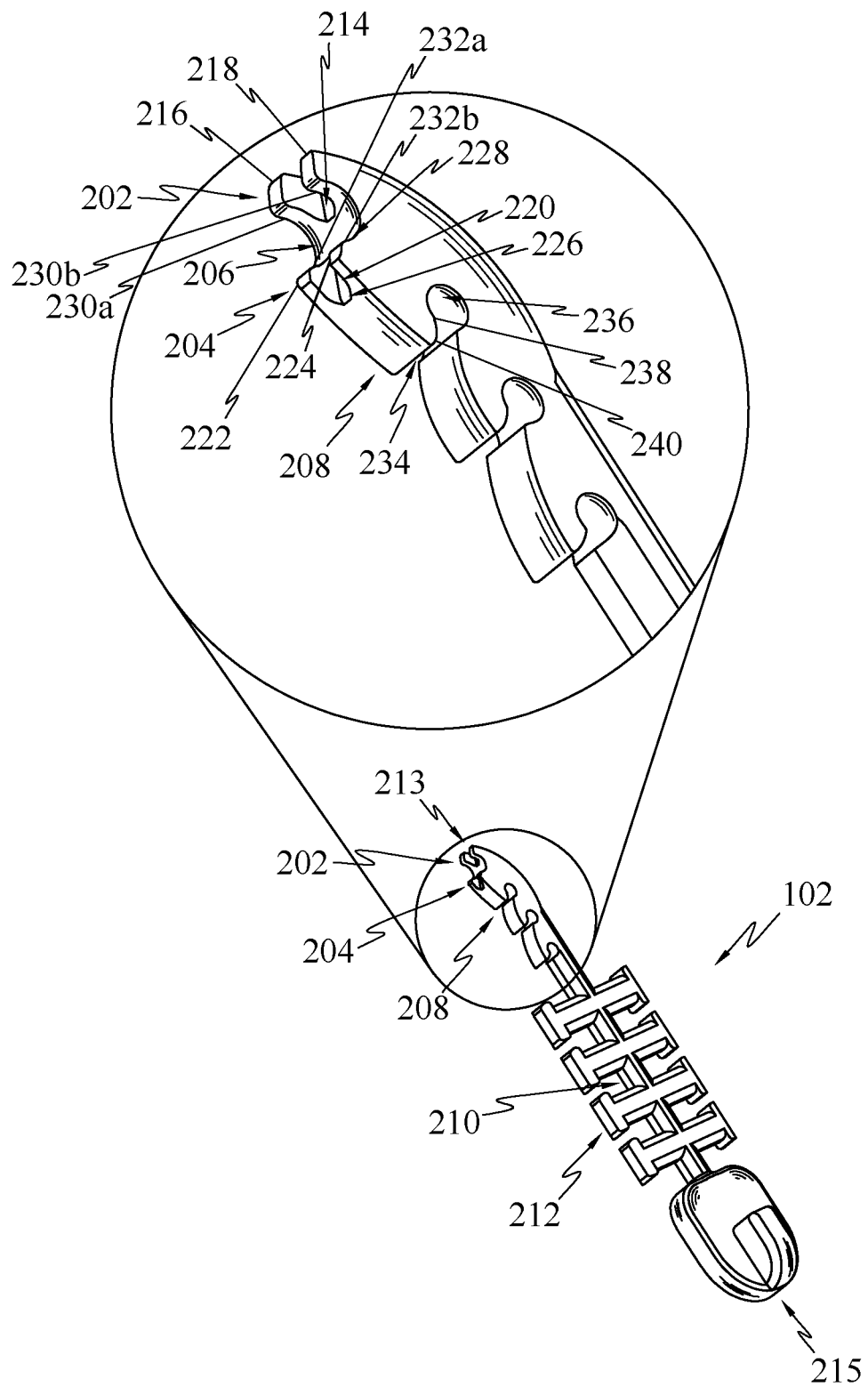
FIG. 2 illustrates a perspective view of a tool 102 with a detailed view of its superior end 213, in accordance with an embodiment.

Referring to FIG. 2, a perspective view of the tool 102 with a detailed view of its superior end 213 is provided, in accordance with an embodiment. The tool 102 comprises an upper guide 202, a lower guide 204, a band interfacing surface 206, a hook portion 208, a trunk portion 210 and band storage posts 212. The tool 102 may be configured to place elastic bands over dental brace hooks.

In an embodiment, the upper guide 202 on the tool 102 may be provided towards the superior end 213 of the tool 102. The upper guide 202 may define an upper guide groove 214. The upper guide 202 comprises a first projecting member 216 and a second projecting member 218, wherein the upper guide groove 214 may be defined between the first projecting member 216 and the second projecting member 218. Internal sides of each of the first projecting member 216 and the second projecting member 218 may define first maneuvering surfaces.

In an embodiment, the lower guide 204 may define a lower guide groove 220. The lower guide 204 may be provided below the upper guide 202. The lower guide 204 comprises a third projecting member 222 and a fourth projecting member 224, wherein the lower guide groove 220 may be defined between the third projecting member 222 and the fourth projecting member 224. Internal sides of each of the third projecting member 222 and the fourth projecting member 224 may define second maneuvering surfaces. The lower guide groove 220 comprises a first side 226 and a second side 228.

In an embodiment, the tool comprises the band interfacing surface 206 that may be defined between the upper guide 202 and the lower guide 204. The upper guide 202, the band interfacing surface 206 and the lower guide 204 may define, but not limited to, a generally "C" shaped profile. The profile may be angled towards the superior end 213 of the tool 102.

In an embodiment, each of the first projecting member 216 and the second projecting member 218 may define a curved elevated surfaces 230a, 230b that may extend from the band interfacing surface 206 towards the superior end 213 of the tool 102. The curved elevated surfaces 230a, 230b may prevent elastic band from sliding out from the band interfacing surface 206 unless the elastic band is pulled towards the superior end 213 of the tool 102.

In an embodiment, each of the third projecting member 222 and the fourth projecting 224 member may define a curved elevated surfaces 232a, 232b that may extend from the band interfacing surface 206 towards the lower guide groove 220. The curved elevated surfaces 232a, 232b may prevent elastic band from sliding out from the band interfacing surface 206 unless the elastic band is pulled towards the superior end 213 of the tool 102.

In an embodiment, the hook portion 208 may be defined below the band interfacing surface 206. The hook portion 206 comprises a hook opening 234, a band resting portion 236 and an anti-slip portion 238. The hook opening 234 may enable elastic band to be received into the band resting portion 236. The anti-slip portion 238 may be provided with a tip 240 that may be exposed to the hook opening 234. The tip 240 of the anti-slip portion 238 may be provided such that at least a portion of the band resting portion 236 may be closer to the superior end 213 of the tool 102 compared to the tip 240 of the anti-slip portion 236.

Figure 3:
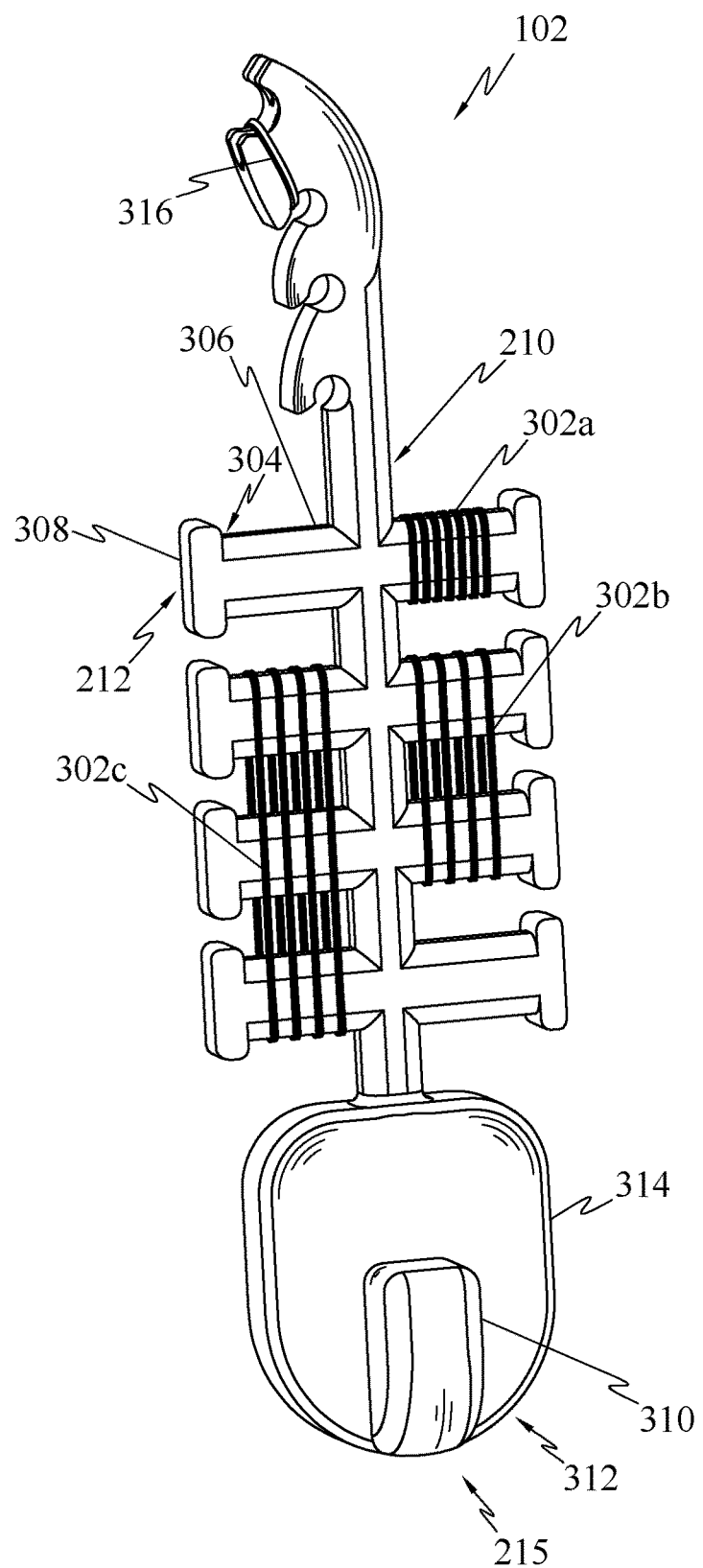
FIG. 3 illustrates a perspective view of the tool 102 with elastic bands received onto band storage posts 212, in accordance with an embodiment.

Referring to FIG. 3, a perspective view of the tool 102 with elastic bands 302a, 302b, 302c of different sizes being received onto the band storage posts 212 is provided, in accordance with an embodiment. The tool 102 comprises the trunk portion 210 and plurality of band storage posts 212. The band storage posts 212 may extend laterally from the trunk portion 210, wherein the band storage posts 212 may be configured to receive elastic bands 302a, 302b, 302c for storage. Each of the band storage posts 212 comprises a free end 304 and a neck portion 306. The neck portion 306 may extend laterally from the trunk portion 210 of the tool 102. The neck portion 306 may define, but not limited to, a rectangular cross section that may extend from the trunk portion 210 of the tool 102. Longitudinal edges of the neck portion 306 may be curved for comfortably receiving the elastic bands 302a, 302b, 302c without rupturing them. The free end 304 of the band storage post 212 may define a head portion 308. Lateral ends of the head portion 308 may extend beyond the neck portion 306. The extended head portion may prevent the elastic bands 302a, 302b, 302c from sliding out of the neck portion 306 of the band storage post 212, unless the elastic bands 302a, 302b, 302c are operated to be taken out of the band storage post 212.

In an exemplary embodiment, the tool may be provided with at least one band storage post. The band storage post comprises a neck portion and a head portion, wherein the neck portion may extend from a trunk portion. Lateral ends of head portion may be configured to prevent elastic bands from sliding out of the neck portion of the band storage post, unless the elastic bands are operated to be taken out of the band storage post.

In an embodiment, the elastic bands 302a, 302b, 302c may be manually disposed over the band storage posts 212. The elastic bands 302a, 302b, 302c may be initially stretched to push the elastic bands 302a, 302b, 302c over the head portion 308 to be received by the neck portion 306 of the band storage post 212. The elastic bands 302a, 302b, 302c may be selectively received across one or multiple of the band storage posts 212 depending on the size of the elastic bands 302a, 302b, 302c. For example, a smaller elastic band 302a may be received by a single band storage post and a comparatively bigger elastic band 302b or 302c may be received by two or more band storage posts 212.

In an embodiment, the tool 102 comprises a protruded member 310 that may be provided towards an inferior end 215 of the tool 102. The protruded member 310 may be provided towards an inferior end 312 of a platform 314 that extends from the trunk portion 210 towards the inferior end 215 of the tool 102.

Figure 4:
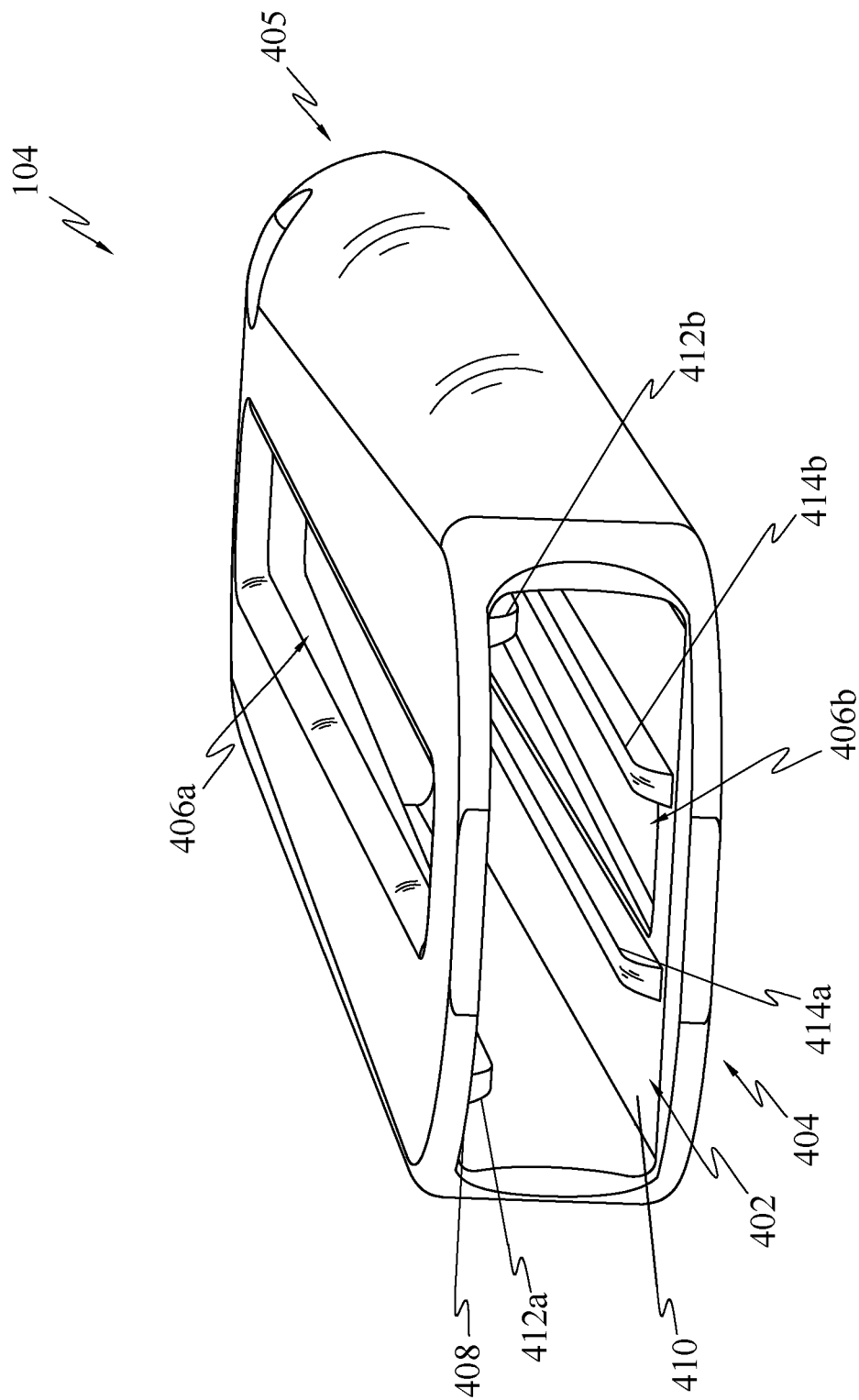
FIG. 4 illustrates a perspective view of a housing 104, in accordance with an embodiment.
Figure 5A:
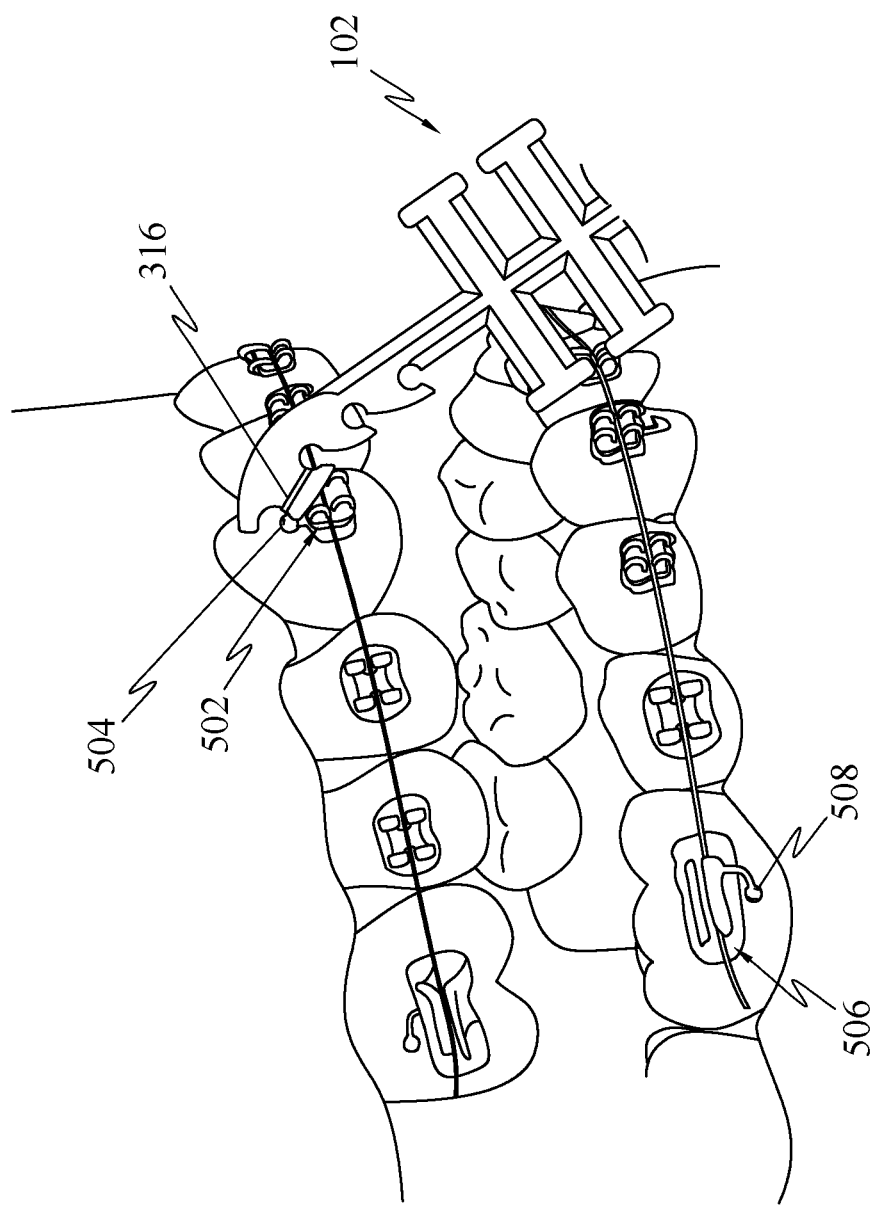
FIG. 5A illustrates the tool 102 being aligned with upper dental brace 502 to dispose elastic band 316 onto dental brace hook 504, in accordance with an embodiment.
Figure 5B:
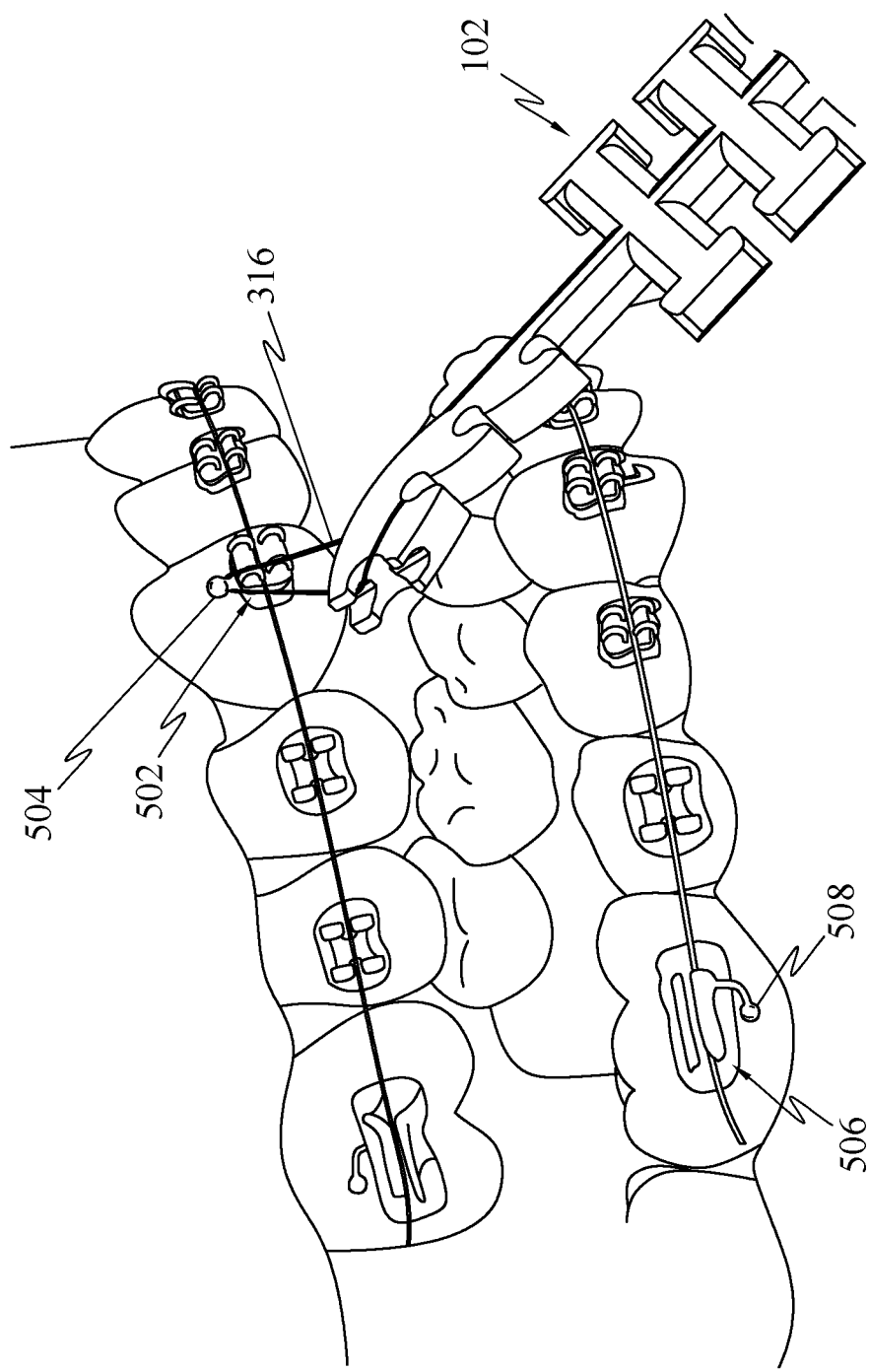
FIG. 5B illustrates the elastic band 316 being received into upper guide groove 202, in accordance with an embodiment.
Figure 5C:
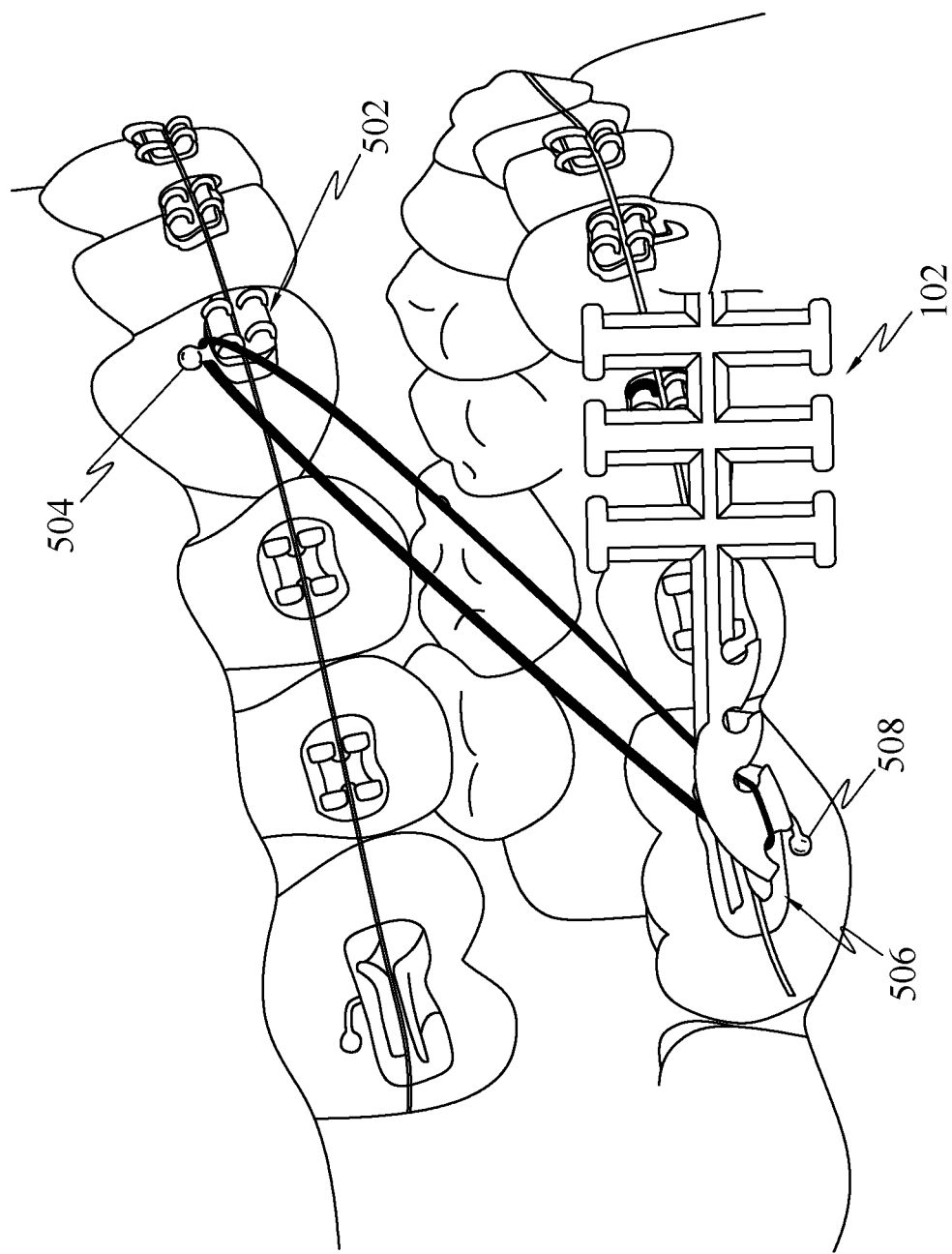
FIG. 5C illustrates the tool 102 being maneuvered towards lower dental brace 506, in accordance with an embodiment.
Figure 5D:
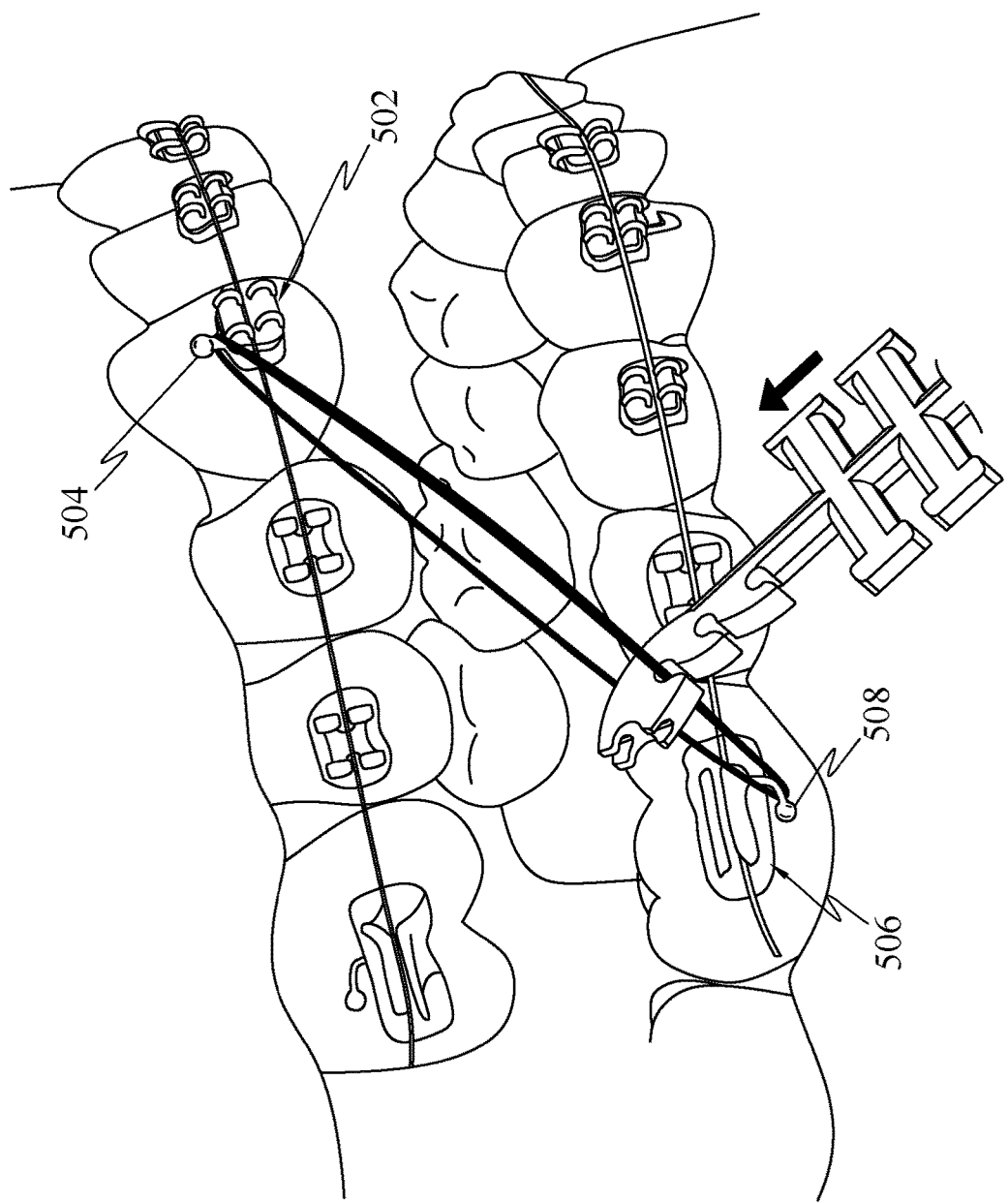
FIG. 5D illustrates the elastic band 316 being disposed onto dental brace hook 508 of lower dental brace 506, in accordance with an embodiment.

In an embodiment, the orthodontic apparatus 100 comprises housing 104 that may be configured to operably receive the tool 102. Referring to FIG. 4, a perspective view of the housing 104 is provided, in accordance with an embodiment. The housing 104 may define an opening 402 towards a distal end 404. The opening 402 may enable the tool 102 to operably move in and out of the housing 104. The housing 104 may define a pair of longitudinal slots 406a, 406b on opposite sides of the housing 104. The pair of longitudinal slots 406a, 406b may be provided along a length of the housing 104. One slot 406a among the pair of longitudinal slots 406a, 406b may be configured to receive the protruded member 310 provided on the tool 102. The protruded member 310 may operably slide along a length of the longitudinal slot 406a. Ends of the longitudinal slot 406a limit movement of the protruded member 310, thereby restricting extended movement of the tool 102.

In an embodiment, two opposite inner surfaces of the housing 104, a first inner surface 408 and a second inner surface 410 may be provided with a first pair of protruding members 412a, 412b and a second pair of protruding members 414a, 414b, respectively. The first pair of protruding members 412a, 412b and the second pair of protruding members 414a, 414b may extend longitudinally along the length of the housing 104. The first pair of protruding members 412a, 412b and second pair of protruding members 414a, 414b may be provided on the sides of the housing 104 wherein the longitudinal slots 406a, 406b are disposed. The first pair of protruding members 412a, 412b may be provided over a first inner surface 408 of the housing 104. The members 412a, 412b of the first pair of protruding members may be spaced at a distance to operably receive the platform 314 of the tool 102 such that the platform 314 can slide back and forth along the length of the housing 104. The first pair of protruding members 412a, 412b may be tapered towards the opening 402 of the housing 104.

In an embodiment, the second pair of protruding members 414a, 414b may be provided over the second inner surface 410 of the housing 104 provided opposite to the first inner surface 408. The second inner surface 410 may be tapered such that portion of the second inner surface 410 towards the proximal end 405 of the housing 104 may be elevated. The second pair of protruding members 414a, 414b may be closely spaced as compared to the first pair of protruding members. The second pair of protruding members 414a, 414b may provide support for the tool 102 when the tool 102 is operably moved in and out of the housing 104.

In an embodiment, the tool 102 may be housed within the housing 104 and may be held in place by friction between the elastic bands disposed over the band storage posts 212 on the tool 102 and the first protruding members 412a, 412b and the second protruding members 414a, 414b provided within the housing 104, whenever the tool 102 is not in use. The tool 102 may be configured to operably slide in and out of the housing 104 through the opening 402 defined towards the distal end 404 of the housing 104.

In an embodiment, a user may operate the orthodontic apparatus 100 by exposing the tool 102. The user may expose the tool 102 by sliding the tool 102 out of the housing 104 by applying force over the protruded member 310 provided towards the inferior end 215 of the tool 102. The tool 102 slides out from the housing 104 thereby exposing the upper guide 202, the lower guide 204, the band interfacing surface 206, the hook portion 208, the trunk portion 210 and the band storage posts 212. The tool 102 may be retrieved back into the housing 104 when not in use. The user may pull back the tool 102 by sliding the protruded member 310 of the tool 102 towards the proximal end 405 of the housing 104. The housing 104 may be configured to protect the tool 102 from dirt or any foreign particle, thereby keeping the elastic bands 302a, 302b, 302c clean within the housing 104.

Operation

Referring to FIGS. 5A-5D, operation of the orthodontic apparatus 100 is disclosed, in accordance with an embodiment. A user, to use the orthodontic apparatus 100 to place elastic band onto dental brace, may slide the protruded member 310 of the tool 102 towards the distal end 404 of the housing 104 thereby exposing the tool 102 for operation. The user, based on the requirement, may select a size of the elastic band, and manually extract one among the plurality of elastic bands 302a, 302b, 302c from the band storage posts 212. The extracted elastic band 316 (refer FIG. 3) may be set onto the tool 102 to be disposed over the dental brace.

Referring to FIG. 2 and FIG. 3, the elastic band 316 is set onto the tool 102, in accordance with an embodiment. The elastic band 316 may be set onto the tool 102 such that a portion of the extracted elastic band 316 may be received by the band resting portion 236 of the hook portion 208 provided below the lower guide 204. The elastic band 316 may be stretched to position another portion of the elastic band 316 over the band interfacing surface 206 defined between the upper guide 202 and the lower guide 204. The elastic band 316 may thereby be operably received around the band interfacing surface 206 and the hook portion 208. The curved elevated surfaces 232a, 232b defined by the third projecting member 222 and the fourth projecting member 224 of the lower guide 204 may prevent the elastic band 316 from sliding out from the band interfacing surface 206 unless the elastic band 316 is intentionally pulled towards the superior end 213 of the tool 102. The anti-slip portion 238 provided with the hook portion 208 prevents the elastic band 316 from slipping out from the band resting portion 236. Upon setting the elastic band 316 onto the tool 102, the user may manoeuvre the orthodontic apparatus 100 to dispose the elastic band 316 onto the dental brace.

In an embodiment, the lower guide groove 220 comprises first side 226 that may face the dental brace hook when the tool 102 is operated to release the elastic band 316 onto a dental brace hook, and the second side 228 may open up to the band interfacing surface 206.

Referring to FIGS. 5A-5D, deploying of the elastic band 316 onto dental braces is disclosed, in accordance with an embodiment. The user may dispose the elastic band 316 onto an upper tooth dental brace 502 and a lower tooth dental brace 506. In order to dispose the elastic band 316 as mentioned, the tool 102 may be moved towards the upper dental brace 502 to align the lower guide 204 of the tool 102 with the dental brace hook 504 provided on the upper dental brace 502. The lower guide 204 may be aligned with the dental brace hook 504 of the upper dental brace 502 such that the dental brace hook 504 may at least be partially received by the lower guide groove 220. The lower guide groove 220 may allow the elastic band 316 to be operably released onto any one among multiple dental brace hooks. The tool 102 may be tilted in an upward direction such that the elastic band 316 is partially received by the dental brace hook 504 of the upper dental brace 502. The tool 502 may then be pulled back such that the elastic band 316 is released from the band interfacing surface 206 and received onto the dental brace hook 504. Once the elastic band 316 is received by the dental brace hook 504 of the upper dental brace 502 and is secured, the tool 102 may be pulled back and turned to stretch the elastic band 316 and position the elastic band 316 into the upper guide groove 214 between the first projecting member 216 and the second projecting member 218. The tool 102, with the elastic band 316 positioned in the upper guide groove 214, may be manoeuvred towards the lower dental brace 506. The lower guide 204 of the tool 102 may be aligned with the dental brace hook 508 of the lower dental brace 506. The first projecting member 216 and the second projecting member 218 of the upper guide groove 214 prevent the elastic band 316 from snapping off from its position. The first maneuvering surfaces 230a, 230b of the first projecting member 216 and the second projecting member 218 enable maneuvering of the elastic band 316. The upper guide 202 may allow the elastic band 316 to be operably received in the upper guide groove 214 enabling the elastic band 316 to be manoeuvred and released onto another of the dental brace hooks. The tool 102, once aligned with the lower dental brace 506, may be slightly rotated such that the elastic band 316 is disengaged from the upper guide groove 214 and is received by the dental brace hook 508 of the lower dental brace 506. Once the elastic band 316 is received by the dental brace hook 508 of the lower dental brace 506 and is secured, the tool 102 may be manoeuvred in an upward direction to release the elastic band 316 from the band resting portion 236 of the hook portion 208.

In an embodiment, the tool 102 may be retrieved back into the housing 104 after completing the operation.

In an embodiment, the tool 102 may be employed to deploy elastic bands over multiple dental brace hooks in a pattern as per requirements. The pattern may be a regular two-point pattern, a three-point triangular pattern or multiple point pattern. The upper guide groove 214 along with the first maneuvering surfaces 230a, 230b enable the user to manoeuvre the elastic band 316 to required position and deploy the elastic band 316 onto dental brace hooks.

Figure 6A:
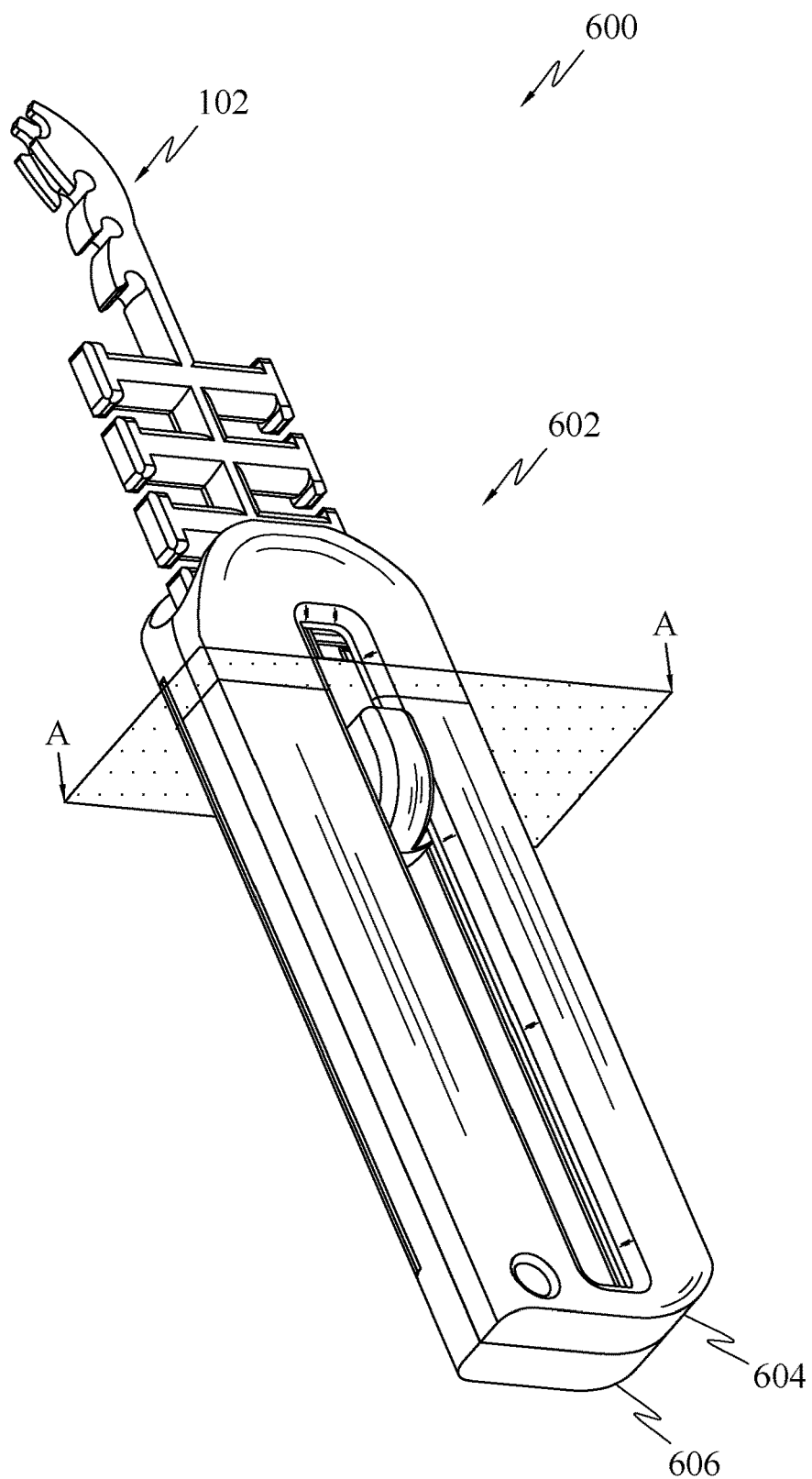
FIG. 6A illustrates a perspective view of a tool with a housing comprising a first part and a second part, in accordance with an embodiment.

Referring to FIG. 6A, an alternate apparatus 600 is disclosed, in accordance with an embodiment. The apparatus may comprise of the tool 102, and a housing 602 comprising two parts. The housing 602 may comprise of two parts i.e., a first part 604 and a second part 606. The first part 604 and the second part 606 may be configured to be detachably coupled to each other. Upon coupling of the first part 604 and the second part 606, the housing 602 may be configured to house the tool 102 within the housing 602. A cross-sectional plane A-A is also depicted in FIG. 6A, wherein corresponding cross-section is depicted in FIG. 6C.

Figure 6B:
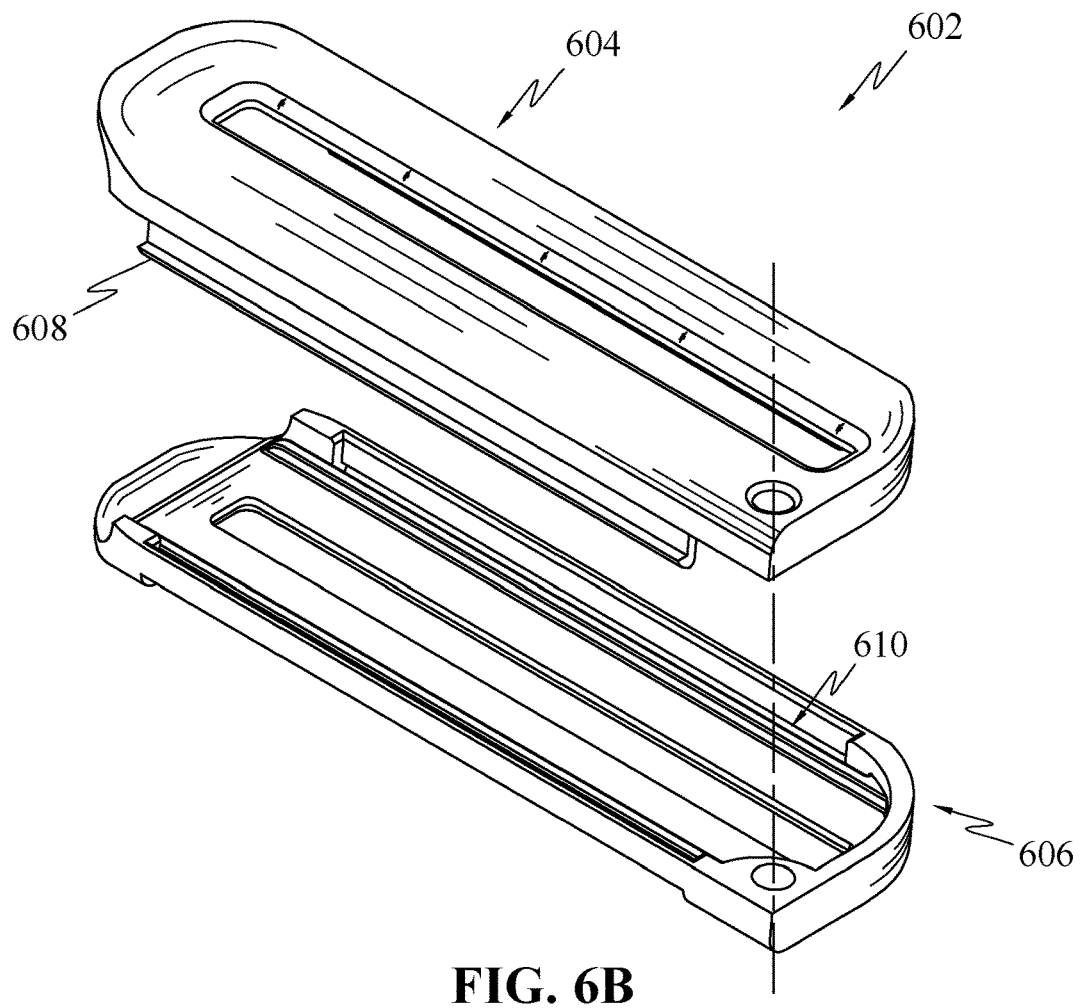
FIG. 6B illustrates an exploded perspective view of the housing, in accordance with an embodiment.
Figure 6C:
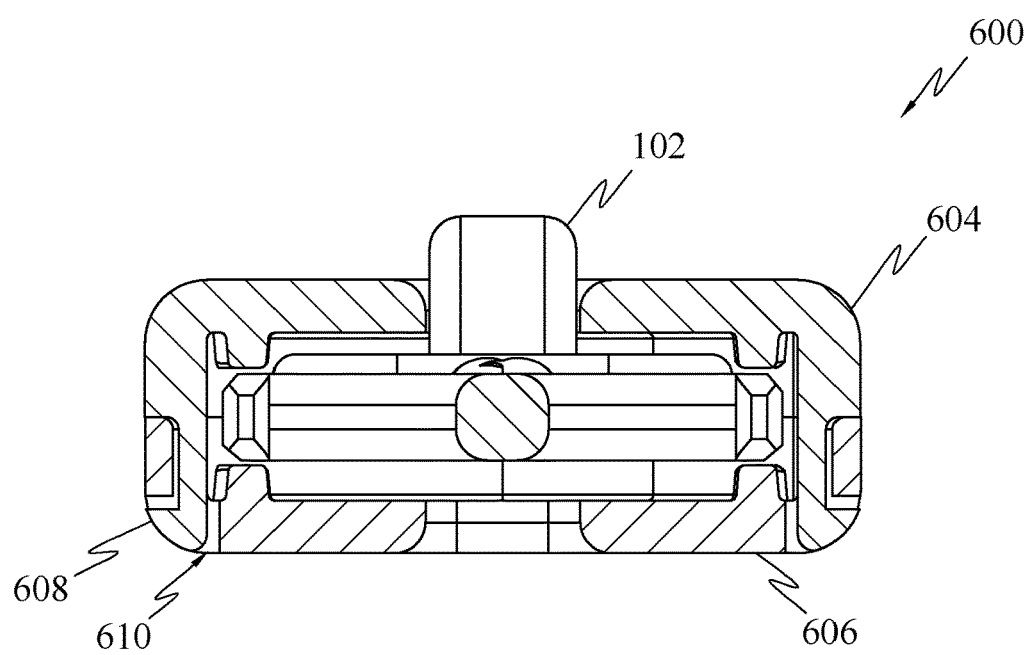
FIG. 6C illustrates a cross-sectional view of the housing with the first part and the second part, in accordance with an embodiment.

In an embodiment, the first part 604 may comprise of a pair of engaging members 608 provided on its opposite sides and the second part 606 may define a pair of slots 610 on its opposite side (refer FIGS. 6B and 6C). The pair of slots 610 on the second part 606 may be configured to receive at least a portion of the pair of engaging members 608 of the first part 604 in a way that the pair of engaging members 608 of the first part 604 may be, but not limited to, snap fit into the pair of slots 610 defined on the second part 606 thereby detachably coupling the first part 604 with the second part 606 (refer FIG. 6C).

In an embodiment, internal structural configuration of the housing 602 may be similar to the housing 104 discussed in the foregoing and is therefore not repeated for the sake of brevity.

It shall be noted that the processes described above are described as sequence of steps; this was done solely for the sake of illustration. Accordingly, it is understood that some steps may be added, some steps may be omitted, the order of the steps may be re-arranged, or some steps may be performed simultaneously.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. An orthodontic apparatus for placing elastic band over dental brace, the apparatus comprising a monolithic/unibody tool, the tool comprising:
   an upper guide defining an upper guide groove, the upper guide provided towards a superior end of the tool;
   a lower guide defining a lower guide groove, the lower guide provided below the upper guide;
   a band interfacing surface defined between the upper guide and the lower guide; and
   a hook portion defined below the band interfacing surface; wherein,
   the elastic band is operable to be received around the band interfacing surface and the hook portion;
   the lower guide groove allows for the elastic band to be operably released onto any one among multiple dental brace hooks; and
   the upper guide allows for the elastic band to be operably received in the upper guide groove to enable the elastic band to be manoeuvred and released onto another of the dental brace hooks.

2. The orthodontic apparatus as claimed in claim 1, wherein,
   the upper guide comprises a first projecting member and a second projecting member, and the upper guide groove is defined between the first projecting member and the second projecting member; and
   the lower guide comprises a third projecting member and a fourth projecting member, and the lower guide groove is defined between the third projecting member and the fourth projecting member.

3. The orthodontic apparatus as claimed in claim 2, wherein each of the third projecting member and a fourth projecting member define curved elevated surfaces extending from the band interfacing surface, wherein the curved elevated surfaces prevents the elastic band from sliding out of the band interfacing surface unless the elastic band is pulled towards the superior end of the tool.

4. The orthodontic apparatus as claimed in claim 2, wherein lower guide groove comprises a first side and a second side, wherein the first side faces the dental brace hook when the tool is operated to release the elastic band onto the dental brace hook, and the second side opens up to the band interfacing surface.

5. The orthodontic apparatus as claimed in claim 2, wherein each of the first projecting member and the second projecting member define curved elevated surfaces extending from the band interfacing surface, wherein the curved elevated surfaces extend towards the superior end of the tool.

6. The orthodontic apparatus as claimed in claim 5, wherein each of the first projecting member and the second projecting member define maneuvering surface defining the upper guide groove, wherein the elastic band interface with the maneuvering surface to enable the elastic band to be manoeuvred and released onto the another of the dental brace hooks.

7. The orthodontic apparatus as claimed in claim 1, wherein the upper guide, the band interfacing surface and the lower guide define a generally "C" shaped profile angled towards the superior end of the tool.

8. The orthodontic apparatus as claimed in claim 1, wherein hook portion comprises a hook opening, a band resting portion and an anti-slip portion, wherein the hook opening enables the elastic band to be received into the band resting portion, and a tip of the anti-slip portion which is exposed to the hook opening, is provided such the at least a portion of the band resting portion is closer to the superior end of the tool compared to the tip of the anti-slip portion.

9. The orthodontic apparatus as claimed in claim 1, further comprising a plurality of the hook portions provided along a longitudinal axis of the tool, wherein the elastic band is selectively received by any one of the hook portions based on tension desired in the elastic band.

10. The orthodontic apparatus as claimed in claim 1, further comprising a trunk portion and a band storage post, wherein the band storage post extends laterally from the trunk portion, wherein the band storage post is configured to receive elastic bands for storage.

11. The orthodontic apparatus as claimed in claim 10, further comprising plurality of the band storage posts provided along a longitudinal axis of the tool, wherein the elastic bands are selectively received across one or multiple of the band storage posts.

12. The orthodontic apparatus as claimed in claim 10, wherein the band storage post comprises a free end and a neck portion, wherein the neck portion extends from the trunk portion, and the free end defines a head portion, wherein the head portion generally prevents the elastic band from sliding out of the band storage post unless the elastic band is operated to be taken out of the band storage post.

13. The orthodontic apparatus as claimed in claim 1, further comprising a housing to operable receive the tool, wherein the tool is configured to operably slide in and out of the housing through an opening defined towards a distal end of the housing.

14. The orthodontic apparatus as claimed in claim 13, wherein the housing defines a pair of longitudinal slots along a length of the housing on opposite sides.

15. The orthodontic apparatus as claimed in claim 14, wherein one among the pair of longitudinal slots receives a protruded member provided towards an inferior end of the tool, such that the protruded member operably slide along length of the pair of longitudinal slots.

16. The orthodontic apparatus as claimed in claim 15, wherein ends of the longitudinal slot limits movement of the protruded member thereby restricting further movement of the tool.

17. The orthodontic apparatus as claimed in claim 16, wherein the tool is housed within the housing and held in place by friction between the elastic band and the housing, when the tool is not in use.

18. The orthodontic apparatus as claimed in claim 13, wherein the housing comprises a first part and a second part, wherein the first part and the second part are detachably coupled to each other.

19. The orthodontic apparatus as claimed in claim 18, wherein,
the first part comprises a pair of engaging members disposed on opposite sides;
the second part defines a pair of slots disposed on opposite sides; and
the slots on the second part are configured to receive the engaging members of the first part, thereby detachably coupling the first part with the second part.

* * * * *